US008252201B1

(12) United States Patent
Dabrowski et al.

(10) Patent No.: US 8,252,201 B1
(45) Date of Patent: Aug. 28, 2012

(54) LIQUID CRYSTALLINE MEDIUM

(75) Inventors: Roman Dabrowski, Warsaw (PL); Jerzy Dziaduszek, Warsaw (PL); Przemyslaw Kula, Warsaw (PL)

(73) Assignee: Military University of Technology, Warsaw (PL)

( * ) Notice: Subject to any disclaimer, the term of this patent is extended or adjusted under 35 U.S.C. 154(b) by 128 days.

(21) Appl. No.: 12/615,082

(22) Filed: Nov. 9, 2009

Related U.S. Application Data

(60) Provisional application No. 61/112,771, filed on Nov. 9, 2008.

(51) Int. Cl.
*C09K 19/00* (2006.01)
*C09K 19/06* (2006.01)
*C09K 19/52* (2006.01)

(52) U.S. Cl. ........... 252/299.6; 252/299.01; 252/299.61; 252/299.62; 252/299.63; 428/1.1

(58) Field of Classification Search ............. 252/299.01, 252/299.6–299.63; 430/20; 428/1.1
See application file for complete search history.

(56) References Cited

FOREIGN PATENT DOCUMENTS

| DE | 199 19 348 A1 | 11/1999 |
| DE | 199 19 348 B4 | 11/1999 |
| DE | 10 2004 058 002 A1 | 7/2005 |
| EP | 0 126 883 A1 | 12/1984 |
| EP | 0 272 580 | 6/1988 |
| EP | 0 332 025 A1 | 9/1989 |
| PL | 137996 | 12/1986 |
| PL | 138287 | 1/1987 |
| PL | 157460 | 10/1989 |
| WO | WO 2007/118623 A1 | 10/2007 |

OTHER PUBLICATIONS

Dbrowski et al., "New liquid-crystalline isothiocyanates with high clearing points, low viscosities and strong nematic character", Liquid Crystals, 1989, vol. 5, No. 1, pp. 209-216.
Dabrowski et al, "Low viscosity, high birefringence liquid crystalline compounds and mixtures" Opto-Electronics Review, 2007, 15(1), pp. 47-51.
Baran et al., "Some Physical Properties of Mesogenic 4-(trans-4'-n-Alkylcyclohexyl) Isothiocyanatobenzenes", Mol. Cryst. Liq. Cryst., 1985, vol. 123, pp. 237-245.
Urban et al., "Phase transition and dielectric studies of a three-ring homologous series with the—Ncs terminal group", Liquid Crystals, 1999, vol. 26, No. 12, pp. 1817-1823.
Urban et al., "Dielectric studies of the 4-$n$-alkyl-4'-thiocyanatobiphenyl ($n$BT) homologous series ($n$=2-10) in the isotropic and E phases", Liquid Crystals, 2001, vol. 28, No. 5, pp. 691-696.
Dabrowski et al., "Mesomorphic Characteristics of Some New Homologous Series with the Isothiocyanato Terminal Group", Mol. Cryst. Liq. Cryst., 1985, vol. 124, pp. 241-257.
Spadlo et al., "Synthesis, mesomorphic and optical properties of isothiocyanatotolanes", Liquid Crystals, 2003, vol. 30, No. 2, pp. 191-198.
Gauza et al, "High figure-of-merit nematic mixtures based on totally unsaturated isothiocyanate liquid crystals", Liquid Crystals, 2006, vol. 33, No. 6, pp. 705-710.
Dabrowski et al, "Synthesis and Mesomorphic Characteristic of Bicyclo-(2,2,2)Octane Derivatives with the—Ncs Terminal Group", Mol. Cryst. Liq. Cryst. 1990, vol. 191, pp. 171-176.

*Primary Examiner* — Geraldina Visconti
(74) *Attorney, Agent, or Firm* — Arent Fox LLP

(57) ABSTRACT

The present invention relates to low viscosity, broad range nematic media having large birefringence and moderately large dielectric anisotropy. The nematic media are useful in a variety of electrooptical devices, including electronic lenses.

8 Claims, No Drawings

LIQUID CRYSTALLINE MEDIUM

RELATED APPLICATION DATA

This application is claims priority to U.S. Provisional Appl. No. 61/112,771 titled "LIQUID CRYSTALLINE MEDIUM" filed Nov. 9, 2008, the entirety of which is hereby incorporated by reference.

JOINT RESEARCH AGREEMENT

This invention was made under a joint research agreement between LensVector, Inc. and Military University of Technology of Warsaw, Poland, dated Dec. 12, 2007.

BACKGROUND

1. Field of the Invention

The present invention results to the low viscosity, broad range nematic media with large birefringence and moderately large dielectric anisotropy. The nematic media are useful in a variety of different electrooptical devices, including electronic lenses.

2. Background of the Technology

Liquid crystal (LC) media are used as dielectrics in different displays and devices, because of their optical properties which can be affectively affected on by applied electric field. Various electrooptical modes such as Twisted Nematic (TN), Supertwisted Nematic (STN), Super Birefringence (SBE), In-Plain Switching (IPS), Vertical Alignment Nematic (VAN) and Fringe Field Switching (FFS) are used and they need a LC medium with properties well tailored to the electrooptical effect and to the cell gap. The most important parameters that ensure good performance of displays and devices are birefringence $\Delta n = n_e - n_o$ (where $n_e$ and $n_o$ are extraordinary and ordinary indices measured at direction parallel to the long and short molecular axis respectively), viscosity (especially rotational viscosity), elastic constants and dielectric anisotropy (the difference of electric permittivity constants $\in_\parallel$ and $\in_\perp$ measured at direction parallel to the long and short molecular axes, respectively).

The birefringence is the most important parameter for many devices, because it determines contrast and speed. A higher birefringence reduces LC crystal layer breadth (cell gap), and increases the response time.

For example, the transmission of light in the device using a twisted nematic layer comprising positive dielectric molecules (TN mode) which is still beneficially used both in direct and active matrices fulfills the expression (1):

$$d \cdot \Delta n = \sqrt{m^2 - 1} \lambda / 2 \tag{1}$$

wherein d—cell gap, $\Delta n$—optical birefringence, $\lambda$—light wavelength, m=2 or 4 constant ensuring the minimum of light transmission.

The switching time being a period of time necessary to reorient molecules from the bright state (transmissive state) to the dark state (non-transmissive state) is given by the expression (2):

$$t_{on} = \frac{\gamma_1 \cdot d^2}{\pi^2 \cdot k_{11}(V_{on}^2 / V_{th}^2 - 1)} \tag{2}$$

wherein $t_{on}$—rise time, $\gamma_1$—rotational viscosity, $k_{11}$—splay elastic constant, $V_{on}$—applied voltage, $V_{th}$—threshold voltage.

The expressions (1) and (2) evidence that $\Delta n$ values, as well as the ratio $\gamma_1/k_{11}$, are fundamental parameters of a LC medium that most affect the response time.

Higher dielectric anisotropy decreases the threshold voltage $V_{th}$, and for the fixed driven voltage $V_{on}$ the rise time $t_{on}$ may also be reduced, but the conductivity of the systems can also increase what is not accepted in many cases. Rather, materials that have low conductivity and moderate $\Delta \in$ are the most desired.

Electronic lenses may be given as another example of devices wherein the birefringence of the LC medium used is very important, and widens the focal length during electric field change, see the formula (3), $$f = \frac{r^2}{2 \cdot d \cdot \Delta n} \tag{3}$$

wherein f—focus length, r—lens radius, d—cell gap.

In this case, a LC composite medium is often used (see: *Appl. Phys. Lett.*, 82 (9), 3537-3539 (2002)). The best performance for such an electronic lens is obtained when the material constants of the LC medium are kept at fixed range of values, for example such as: $\Delta \in =5\text{-}12$, $\in_\perp =18\text{-}30$, $\gamma_1<200$, $\Delta n \sim 0.25\text{-}0.3$ and nematic range is broader then $-20$ to 90. The properties of individual compounds such as: good chemical and photochemical stability, low melting point, low melting enthalpy, and low tendency to create a smectic phase, are also very important and determine their utility for being used as the component of the LC medium.

The cyano derivatives of biphenyl and terphenyl compounds are nematics with high birefringence, but their dielectric anisotropy and viscosity is rather large. See, for example, the properties of the mixture E7, which is a four component polar LC medium ($\Delta n=0.225$, $\eta=40$ cP)

Cr—N (−10); N-Iso 60.5; $\Delta n=0.225$; $\eta=40$ at 20° C.

(BDH Chemical Ltd., product information).

Some LC crystals with isothiocyanato [NCS] terminal group have bigger birefringence, lower viscosity and dielectric anisotropy, and bigger elastic constant than cyano compounds, see U.S. Pat. No. 4,528,116 and paper *Mol. Cryst. Liq. Cryst.*, 91, 17-27 (1990) but the isothiocyanato-biphenyl and terphenyls show only high ordered smectic phases, see example:

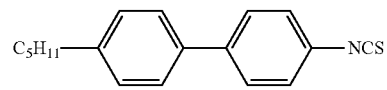

Cr 57.8 SmE 72.4 Iso *Phase Transitions*, 79, 331-342 (2006)

Therefore they are not able to be used as the main component of the nematic mixtures. Fluorine atoms introduced to the biphenyl core cancel smectic phases and a nematic phase is created, but only as the monotropic one with low clearing point, see, for example:

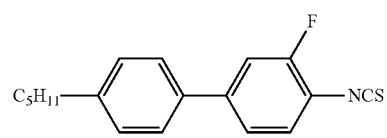

Cr 31.8 (N 19.8) Iso

Placing into terphenyl core only one fluorine atom, still leads to the smectic compounds with very high melting points, see, for example:

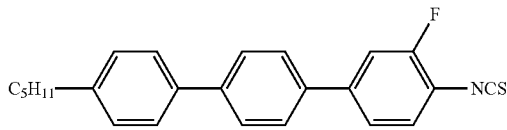

Cr 168.2 SmA 194.7 N 226.5 Iso *Conference Proceedings, XVI Conference on Liquid Crystals*, Stare Jablonki 2005, Poland, s. 71-76 (2007)

Isothiocyanatoterphenyls with two or more fluorine atoms in the aromatic core are nematics in broad temperature range. Their usefulness in preparing high birefringence nematic mixtures was recently demonstrated in *Opto-Electronics Review* 15(1), 47-51 (2007), but they have simultaneously large dielectric anisotropy ($\Delta\epsilon>10$), such as mixtures of cyanocompounds. Among isothiocyanato derivatives with cyclohexylphenyl, bicyclohexylphenyl and cyclohexylethyl-cyclohexylphenyl cores the lowest kinematic and rotational viscosity and high $k_{11}$ values shown the following compounds:

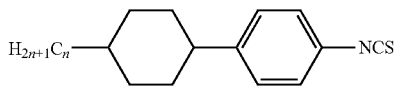

n=6 Cr 12.5 N 43.0 Iso, U.S. Pat. No. 4,528,116 (1985)

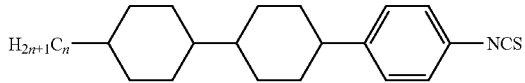

n=3 Cr 76.5 N 248.7 Iso, *Liq. Cryst.* 26, 1817-1823 (1999)

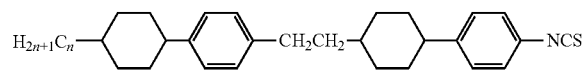

n=4 Cr 87.5 N 260 Iso, Eur. Pat., 0 272 580 and the mixture with low viscosity and low temperature dependence of viscosity may be created, see U.S. Pat. Nos. 4,849,130, 4,528,116, and paper *SPIE*, 4147, 41-48 (1999).

Because of the presence of saturated rings they have lower birefringence than fully aromatic structures.

Although mixtures composed of simultaneously cyclohexylphenyl derivatives of isothiocyanates and some amounts of smectic biphenyl derivative of isothiocyanates and nematic terphenyl isothiocyanates may show birefringence higher than 0.25, but still their dielectric anisotropy is too high for some applications. Usually to decrease the dielectric anisotropy of the LC medium it is necessary to dilute it with low polar or nonpolar liquid crystalline compounds. The nonpolar high birefringence hydrocarbons, such as dialkyl- or alkyl alkoxy-, biphenyl or terphenyl have only high ordered smectic phases, see for example:

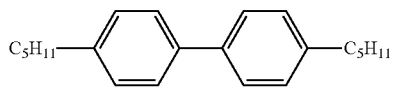

Cr 25.1 SmE$_1$ 46.1 SmE$_2$ 47.1 N 52.3 Iso *Mol. Cryst. Liq. Cryst.*, 260, 435-442 (1995)

Those which have a nematic phase, such as esters or tolanes, which are frequently and commonly used as the components of high birefringence mixtures, are not useful here because together with the isothiocyanates they have strong tendency to induce smectic phases *Mol. Cryst. Liq. Cryst.*, 124, 241-257 (1985).

Accordingly, finding good components for decreasing dielectric permittivity of isothiocyanato nematic mixtures without strongly decreasing their birefringence, and keeping their nematic phase over a broad range of temperatures is still a problem.

SUMMARY OF THE INVENTION

The present invention solves this problem and meets the unmet needs of the art, as well as others, by providing liquid crystal media that are useful in a variety of different electrooptical devices, including, but not limited to, electronic lenses.

According to one aspect, the present invention relates to a liquid crystalline low viscosity nematic medium including a mixture having at least six isothiocyanato components selected from the group consisting of formulae 1-13:

1

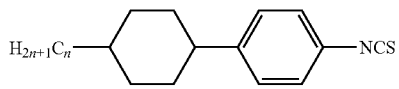

2

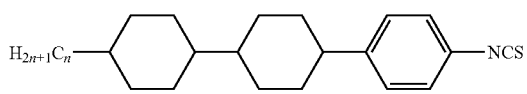

3

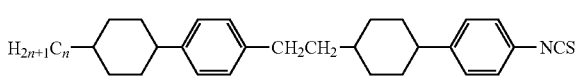

4

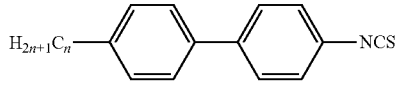

5

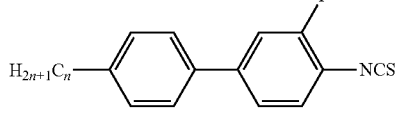

6

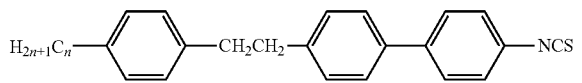

7

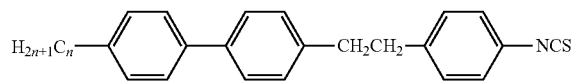

-continued

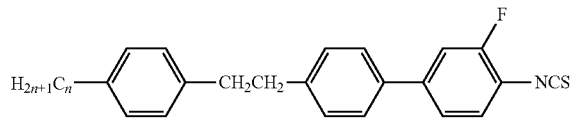
8

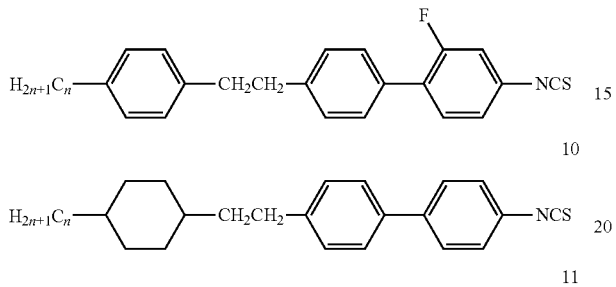
9

10

11

12

13 and at least one compound selected from the group consisting of fluorosubstituted biphenyls and/or terphenyls expressed by the formulae 14-24

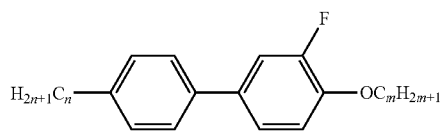
14

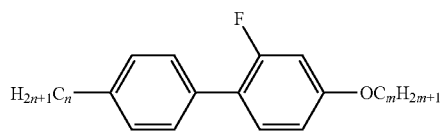
15

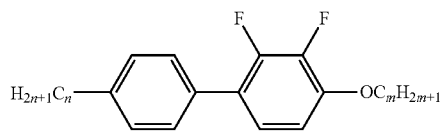
16

-continued

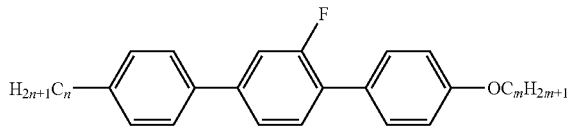
17

18

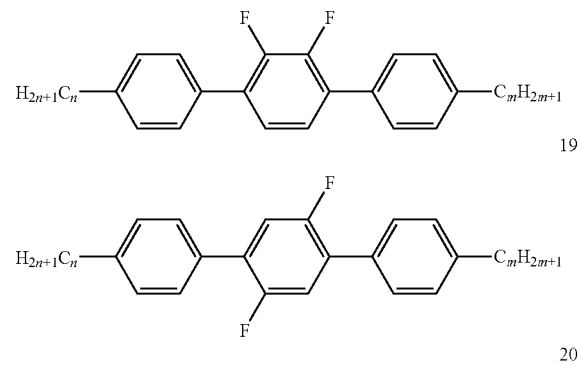
19

20

21

22

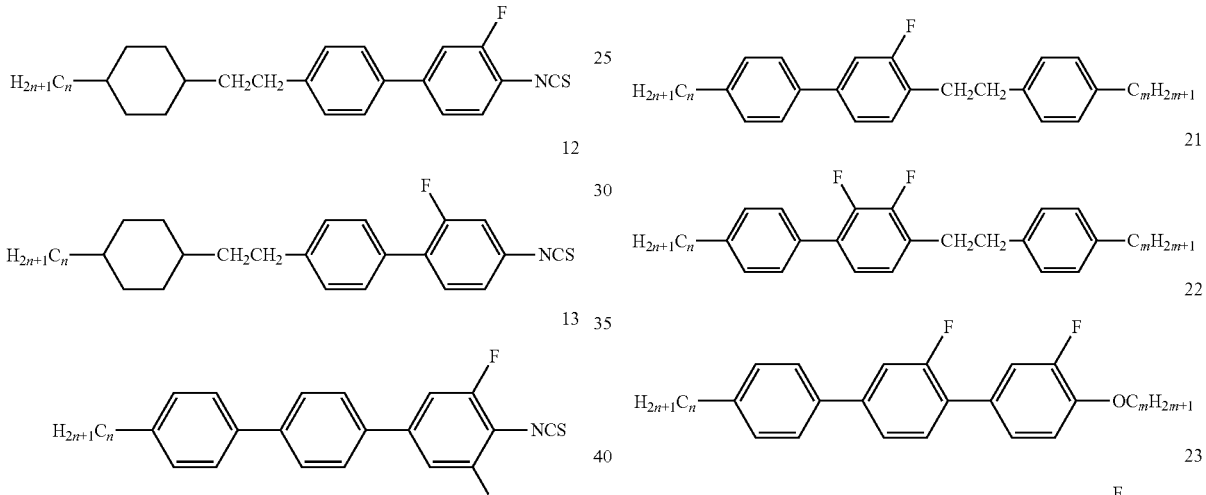
23

24

Other novel features and advantages of the present invention will become apparent to those skilled in the art upon examination of the following or upon learning by practice of the invention.

DETAILED DESCRIPTION OF THE INVENTION

Aspects of the present invention now will be described more fully, including variations thereof. Aspects of the present invention may, however, be realized in many different forms and should not be construed as limited to the variations set forth herein; rather, these variations are provided so that this disclosure will be thorough and complete in the illustrative implementations, and will fully convey the scope thereof to those skilled in the art.

Unless otherwise defined, all technical and scientific terms used herein have the same meaning as commonly understood by one of ordinary skill in the art to which aspects of the present invention belong. The methods and examples provided herein are illustrative only and not intended to be limiting.

Surprisingly it has been found that a liquid crystalline nematic medium with large birefringence Δn, low viscosity, and moderate to large dielectric anisotropy, especially useful for optical electronic lens, can be realized based on a mixture A including one or more dielectrically positive isothiocyanates chosen from the compounds of the formulae 1-13 set forth below. According to a preferred aspect of the invention, two, three, four, five, six, or more dielectrically positive isothiocyanates are included in mixture A. According to a still more preferred aspect of the invention, six or more of the dielectrically positive isothiocyanates are included in mixture A.

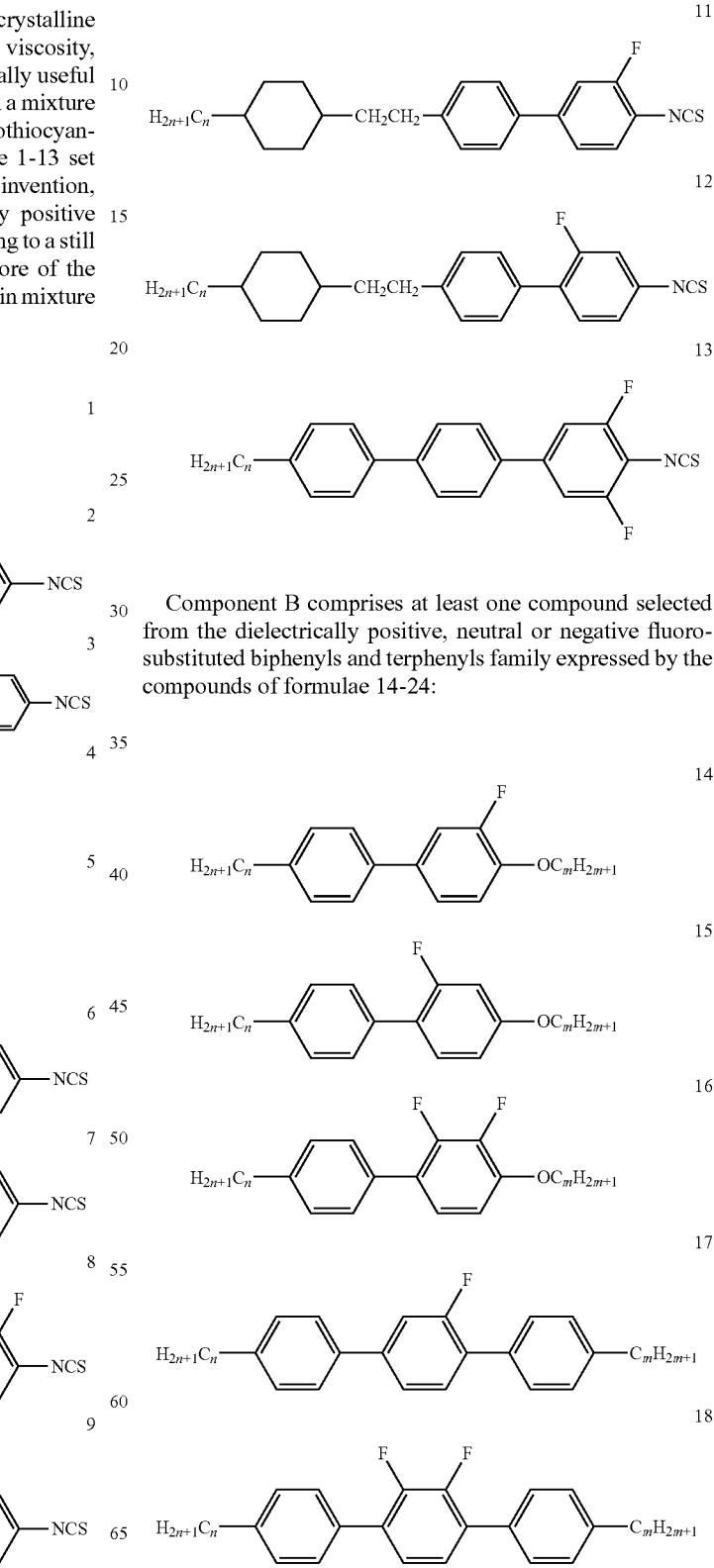

Component B comprises at least one compound selected from the dielectrically positive, neutral or negative fluoro-substituted biphenyls and terphenyls family expressed by the compounds of formulae 14-24:

19

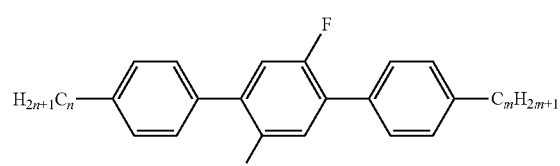

20

21

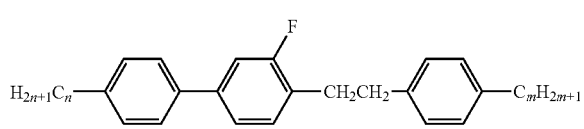

22

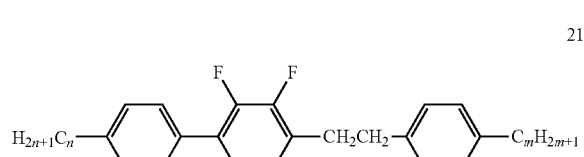

23

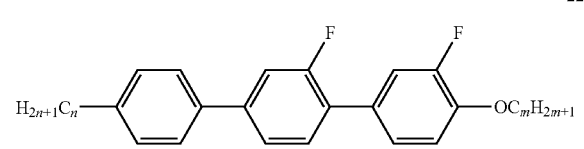

24

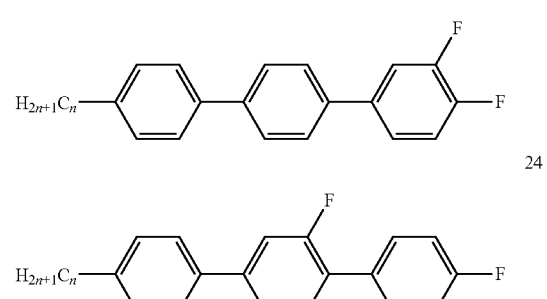

According to some aspects, mixture A may form from about 40% to about 95% of the LC medium.

In the mixture A, inclusion of components 1-3 ensures low viscosity and the low temperature dependence of viscosity, but because of their medium birefringence their concentration should be limited to about 40 wt. %, and it would be lower if higher Δn is desired.

Compounds of formulae 4, 6 and 7 also have low viscosity and large $k_{11}$ values, but due to their higher smectogenity their optimal amounts is below 30 wt. %. Such limitations are not restricted to monofluorosubstituted compounds of formulae 8, 9, 11 and 12, they are strong nematics like the compounds of formulae I-3. The compounds 8, 9, 11 and 12 are new compounds prepared specially for the described invention. The recommended method of their preparation is given in schemes 1 and 2, and the preparation procedures are described in greater detail in the Examples.

Scheme 1.
Route of synthesis for compounds of formula 8.
The compound of formula 9 are prepared in the same way taking 4-iodo-3-fluoroaniline instead of 4-iodo-2-fluoroaniline.

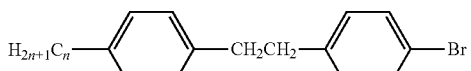

I

1. Mg, THF
2. B(OC$_3$H$_7$)$_3$
3. HCl aq.

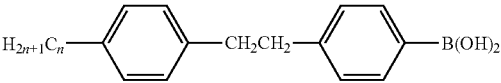

II

1. 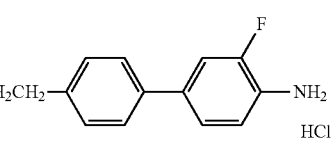

Pd(OCOOCH$_3$)$_2$, K$_2$CO$_3$, H$_2$O, acetone

2. HCl aq.

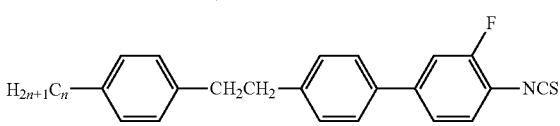

III

CSCl$_2$, chloroform

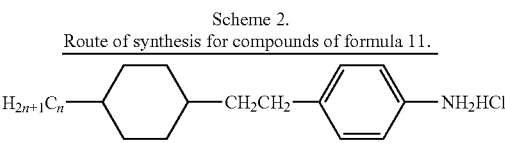

8

Scheme 1. Route of synthesis for compounds of formula 8. The compound of formula 9 are prepared in the same way taking 4-iodo-3-fluoroaniline instead of 4-iodo-2-fluoroaniline.

Scheme 2.
Route of synthesis for compounds of formula 11.

H$_{2n+1}$C$_n$—⬡—CH$_2$CH$_2$—⌬—NH$_2$HCl

1. NaNO$_2$, HCl, H$_2$O
2. KJ

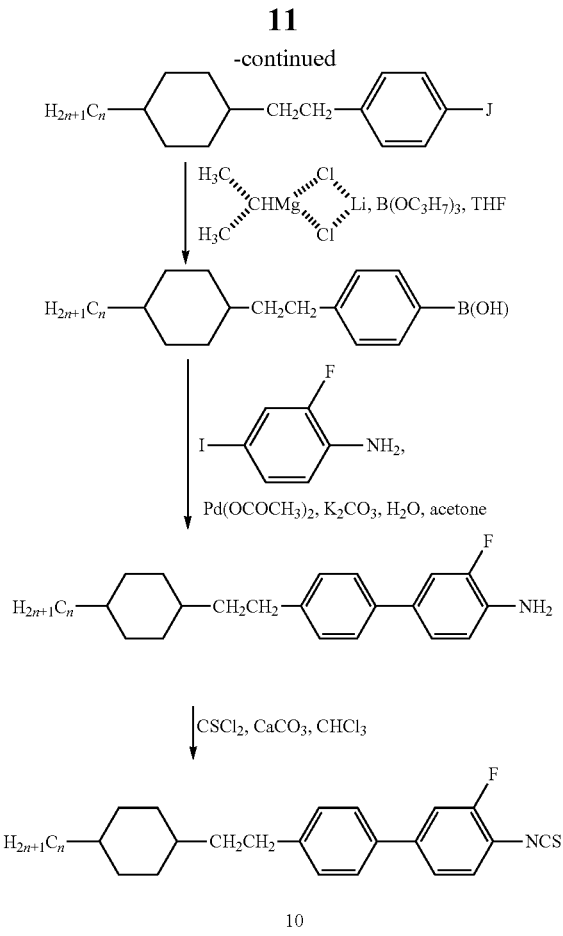

Scheme 2. Route of synthesis for compounds of formula 11.

Compounds of formulas 5 and 13 have the largest Δn and ΔЄ, so their content depends of the level of ΔЄ that is desired.

The compounds useful for diluting mixture A that do not induce a smectic phase are fluorosubstituted derivatives of biphenyls and terphenyls, especially chosen from the family of compounds expressed by the formulae 14-24 but not analogous tolanes of phenyltolanes. Some such compounds were prepared many years ago, see the U.S. Pat. No. 4,594,465 and papers *SPIE*, 3955, 15-23 (2000); Opto-Electronics Review 16(4), 379-385 (2008), *Liq. Cryst* 5 159-170 (1989), *Mol. Cryst. Liq. Cryst.* 123 185-204 (1985), Z. Naturforsch. B 38b 1221 (1983), *Mol. Cryst. Liq. Cryst.* 204 43-64 1991 and recently the state of the art referring to fluorinated compounds was reviewed in *Chem. Soc. Rev.,* 36, 2070-2095 (2007). Fluoro substituted terphenyls such as the compounds of formulae 17 and 18 with long alkyl or alkoxy chains show tilted smectic C phase and were used for the preparation of ferroelectric medium, after mixing with chiral dopants. Members with short chain n=1-5 and m=1-5 are most useful here. The difluorosubstituted compounds of formulae 16, 18 and 21 in the position 2, 3 show negative dielectric anisotropy $\in_\perp > \in_\parallel$. Their use as a mixture components decrease ΔЄ and ΔЄ/$\in_\perp$ more effectively than other ones, but simultaneously increase viscosity more than in the case of monofluorosubstituted ones. Compounds of formulae 14, 15, 17, 19 and 20 are dielectrically neutral or have very small positive dielectric anisotropy, so they also effectively decrease ΔЄ value. The last proposed compounds of formulae 22-24 have bigger positive ΔЄ, but still much lower than compounds with NCS groups. Recently such materials are being used as the LC medium for TN and STN mode, see UK Pat. No. 2,374,347 A, and U.S. Pat. No. 5,827,450.

Part of the liquid crystal fluorocompounds which can be proposed as liquid crystal components are known from the state of the art and their preparation was described previously. Some are new ones, which were not described earlier, and are characterized here and their method of the syntheses is given on Scheme 3. This scheme may be also used to prepare other fluorinated compounds used herein as mixture components in a more convenient way than was previously disclosed.

Scheme 3.
Route of the syntheses compounds of formulae 14 and 20. This scheme may be used to synthesize compounds of formulae 15, 16, 17, 18, 19, 21 and 22 by changing some substrates.

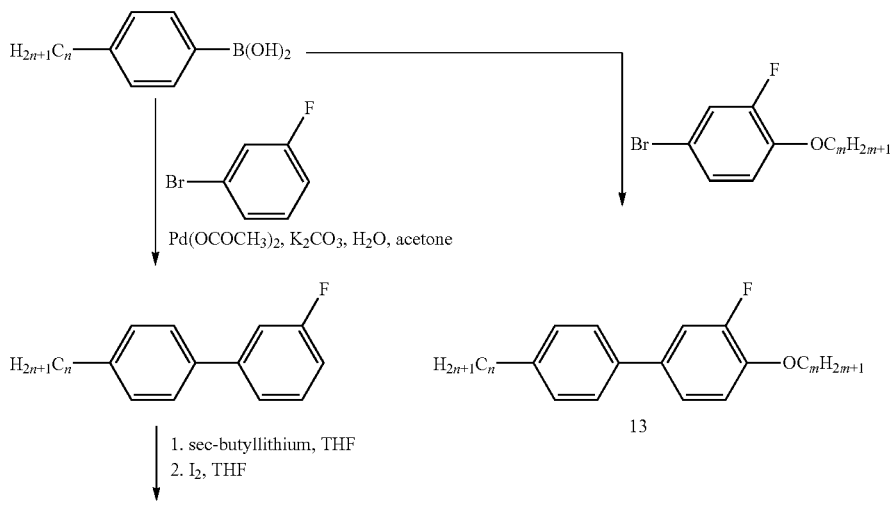

-continued

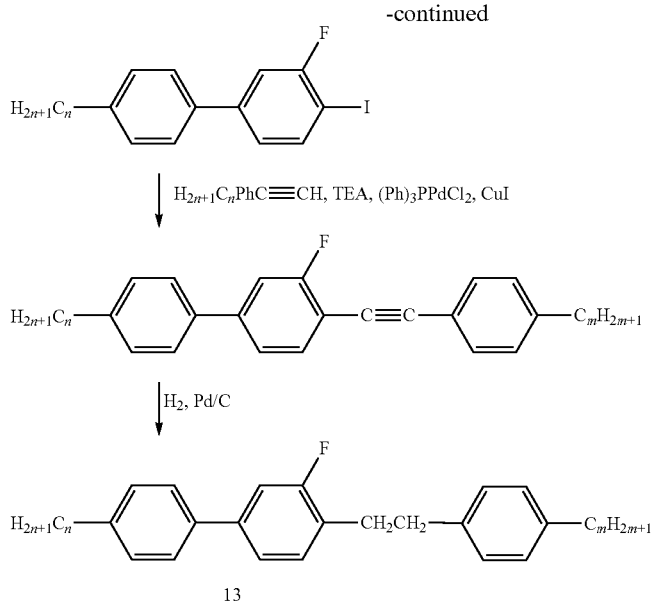

13

Scheme 3. Route of the syntheses compounds of formulae 14 and 20. This scheme may be used to synthesize compounds of formulae 15, 16, 17, 18, 19, 21 and 22 by changing some substrates.

Below are summarized sources of information referring to the method of the preparation of the compounds of formulae 1-24.

The methods of preparation of the compounds of formulae 1 are described in U.S. Pat. No. 4,528,116; the compounds of formulae 5 and 13 were described in *Conference Proceedings, XVI Conference on Liquid Crystals*, Stare Jablonki 2005, Poland, s. 71-76 (2007).

Compounds of formulae 6 and 10 are described in U.S. Pat. No. 4,849,130 (1989); compounds of formulae 8, 9, 11, 12, 14, 15, 17, 20, 21 and 22 are described herein, see Examples; the compound of formula 23 are described in U.S. Pat. No. 4,594,465, WO 90/09420 (1990), compounds of formulae 16 and 18 are described in *Opto-Electronics Review* 16(4), 379-385 (2008), and the compound of formula 19 are described in *Mol. Cryst. Liq. Cryst.*, 204, 43-64 (1991).

The liquid crystal medium which can be formulated according to the invention is prepared using techniques that are well known to those skilled in the art. To obtain an LC medium with a broad range of nematic phase, components with low melting point and low melting enthalpy as well as those which have high clearing points are mixed and fused together in the proportion related to their melting point and enthalpy properties. The lower melting point and the lower melting enthalpy the higher content is allowed. Usually a mixture contains a dozen different individual compounds. To improve space orientation the small amounts of chiral compounds being pure S or R enantiomers can be added. Valuable dopants are compounds from isothiocyanates expressed in formulae 25 and 26 or from fluorinated family expressed by formula 27 in the amount from 0.1 to 2 wt. %, usually 0.5 wt. % or others:

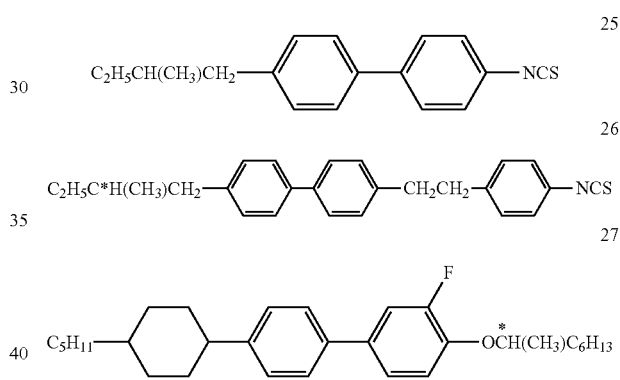

UV stabilizers and antioxidants that are derivatives of different ter-butylphenols or stable free radicals of the piperidoxyl family may also be used in small amounts, usually below 5 wt. %.

The following examples are intended to explain the invention without limiting it. Composition is given in percent by weight. All temperatures are given in degrees Celsius, Cr—crystalline state, N—nematic phase, mp.—melting point, N—I—clearing point, $\Delta n$—optical anisotropy (589 nm, 20° C.), $\Delta \varepsilon$—dielectric anisotropy (1 KHz, 20° C.), $\eta$—bulk viscosity (mPa·s), flow viscosity v (mm$^2$/sec at 20° C.), where $\eta = v \cdot \rho$ (density), $v \approx \eta$ (because density of LC is in the range 0.98-1.02 g cm$^{-3}$ at 20° C.), rotational viscosity $\gamma_1$ (mPa·s), elastic constant (pN).

The liquid crystal mixtures according to the invention enable a significant widening of the available parameters to the previous isothiocyanato LC materials known from the prior art, because having very broad range of nematic phase they combine high birefringence with low kinematic and rotational viscosity.

Is also possible to easily transform the described LC medium to the composite material by introducing some amount of monomer. The monomers may be monofunctional or a mixture of monofunctional, bifunctional and trifunctional monomers, and a polymer network of different space structure and rigidness may be formed, and polymer dispersed systems using the inventive compositions may be produced as well.

EXAMPLES

Example 1

4'-(4-butylphenylethyl-2)-3-fluoro-4-isothiocyanatobiphenyl

Step I (See Scheme 1)

Magnesium foil (4.8 g, 0.2 mole), THF (5 cm$^3$) and a small piece of solid I$_2$ were placed in flask and a solution prepared from 1-(4-butylphenyl)-2-(4-bromophenyl)ethane (63 g, 0.2 mole) and THF (200 cm$^3$) was dropping. After exothermic reaction was stopped then the temperature was decreased to (−65° C.) and tripropylborane (45 g, 0.24 mole) was dropped. Then the mixture was stirred still for 0.5 hour and temperature was allowed to reach room temperature. Mixture was acidified with solution of 15% HCl (50 cm$^3$) and solvent was evaporated. 4-(4-Butylphenylethyl-2)phenylboronic acid was separated, yield (40 g, 0.144 mole), 72%.

Steps II and III

A mixture consisted of (23 g, 0.0816 mole) 4-(4-butylphenylethyl-2)phenyl boronic acid, 2-fluoro-4-iodoaniline (19.33 g, 0.0816 mole), K$_2$CO$_3$ (45 g, 0.326 mole), acetone (200 cm$^3$) and water (200 cm$^3$) was boiling in N$_2$ atmosphere for 0.5 h, then the mixture was cooled to 55° C. and small amount of (CH$_3$COO)$_2$Pd was added. Temperature rapidly increased and a solid was separated. Acetone was distilled off and to the rest 15 wt. % solution of hydrochloric acid was dropped to obtain pH<7. Then CHCl$_3$ (250 cm$^3$) and (11 g, 0.098 mole) thiophosgene was added and the mixture was stirred to remove free amine.

The mixture was filtered through filtering sheet with active carbon. CHCl$_3$ layer was separated, dried over MgSO$_4$ and the solvent was evaporated. Solid rest was crystallized from acetone-methanol solution and purified on chromatography column filled with silica gel and crystallized again from acetone-methanol solution.

Yield (17.7 g, 0.045 mole), 55.7%, phase transition: Cr 56.5 N 114.9 Iso.

In the same way the following compounds were obtained:
4'-(4-methylphenylethyl-2)-3-fluoro-4-isothiocyanatobiphenyl
4'-(4-ethylphenylethyl-2)-3-fluoro-4-isothiocyanatobiphenyl
4'-(4-propylphenylethyl-2)-3-fluoro-4-isothiocyanatobiphenyl, Cr 72 N 124 Iso
4'-(4-pentylphenylethyl-2)-3-fluoro-4-isothiocyanatobiphenyl

Example 2

4'-(4-butylphenylethyl-2)-2-fluoro-4-isothiocyanatobiphenyl

The compound was obtained in the same procedures as 4'-(4-butylphenylethyl-2)-3-fluoro-4-isothiocyanatobiphenyl taking in the step II 3-fluoro-4-iodoaniline instead of 2-fluoro-4-iodoaniline, yield 58%.

Phase transition: Cr 43.7 N 89 Iso

The same way the following compounds were obtained:
4'-(4-methylphenylethyl-2)-2-fluoro-4-isothiocyanatobiphenyl
4'-(4-ethylphenylethyl-2)-2-fluoro-4-isothiocyanatobiphenyl
4'-(4-propylphenylethyl-2)-2-fluoro-4-isothiocyanatobiphenyl, Cr 79 N 102.2 Iso
4'-(4-pentylphenylethyl-2)-2-fluoro-4-isothiocyanatobiphenyl

Example 3

4-(trans-4-propylcyclohexylethyl-2)-3-fluoro-4-isothiocyanatobiphenyl

Step I (See Scheme 2)

Hydrochloride 1-(4-trans-propylcyclohexyl)-2-(aminophenyl)ethane (43.6 g, 0.155 mole), concentrated HCl acid (25 cm$^3$), dioxane (300 cm$^3$) was cooled during steering to 0° C. Then water solution NaNO$_2$ (11.2 g, 0.163 mole in 56 cm$^3$ H$_2$O) was dropped and the formed diazonium hydrochloride a water solution of KJ was dropped (30.9 g in 30 cm$^3$ H$_2$O) and heated. After finishing gas evolution, the product was extracted by methylene chloride, decolored, dried, and the methylene chloride was distilled off.

Yield 1-(4-trans-propylcyclohexyl)-2-(4-iodophenyl) ethane (33 g, 0.105 mole), 67.6%.

Step II 1-(4-trans-propylcyclohexyl)-2-(4-iodophenyl)ethane (41 g, 0.115 mole), THF (150 cm$^3$) were placed in the flask and bubbled with dry N$_2$ and cooled to 0° C. Then THF solution of complex magnesium isopropyl chloride with LiCl (0.125 mole) was added, then cooled to (−65° C.) and tripropylborane (25.5 g, 0.138 mole) was dropping slowly to keep temperature constant. Then temperature was allowed to reach 25° C. and 20% H$_2$SO$_4$ was dropped, solvent was evaporated, and the product was separated by filtration. Yield of 4-(trans-4-propylcyclohexylethyl-2)phenyl boronic acid (24.4 g, 0.089 mole), 77.4%.

Steps III and IV 4-(4-trans-propylcyclohexylethyl-2)phenyl boronic acid (12.2 g, 0.045 mole), 2-fluoro-4-iodoaniline (10.5 g, 0.0445 mole), K$_2$CO$_3$ (24.6 g, 0.178 mole), acetone (150 cm$^3$) and water (150 cm$^3$) was placed in flask and N$_2$ was bubbled during stirring and mixture was heated to boil during 0.5 h. Then temperature was decreased to 55° C. and small amount (CH$_3$COO)$_2$Pd was added. When exothermic reaction was ended, acetone was distilled off and the mixture was acidified by 15 wt. % hydrochloride acid to reach ph<7. Then CHCl$_3$ (150 cm$^3$), thiophosgene (6.14 g, 0.0534 mole) was added and mixture was stirred to disappearing free amine. Then the mixture was filtered, an organic layer was separated, dried over MgSO$_4$ and CHCl$_3$ was distilled off. The raw product was crystallized the first time from acetone-methanol solution, then eluted on chromatographic column with silica gel and again crystallized from acetone-methanol solution.

Yield of 4'-(4-trans-propylcyclohexylethyl-2)-3-fluoro-4-isothiocyanatobiphenyl (12.2 g, 0.033 mole), 74.3%. Phase transition: Cr 68.3 N 180.5 Iso.

In the same way the following compounds were obtained:
4'-(4-trans-ethylcyclohexylethyl-2)-3-fluoro-4-isothiocyanatobiphenyl,
4'-(4-trans-butylcyclohexylethyl-2)-3-fluoro-4-isothiocyanatobiphenyl, Cr 58 N 114.9 Iso
4'-(4-trans-pentylcyclohexylethyl-2)-3-fluoro-4-isothiocyanatobiphenyl, Cr 59 175.5 Iso

Example 4

1-(4'-propyl-3-fluorobiphenyl-4-yl)-2-(4-propylphenyl)ethane

Step I (See Scheme 3)

4'-propylphenylboronic acid (48.3 g, 0.295 mole), 3-fluorobromobenzene (51.5 g, 0.295 mole), $K_2CO_3$ (162.6 g, 1.18 mole), acetone (250 cm$^3$) and $H_2O$ (250 cm$^3$) were placed in flask and during stirring $N_2$ was bubbled and mixture was heated to boil. Then mixture was cooled to 50° C., $(CH_3COO)_2$ Pd (2% mole) was added and after the exothermic reaction felt acetone was distilled off and the product was distilled under low pressure.

Yield 4-propyl-3-fluorobiphenyl (52 g, 0.246 mole), 60.3 wt. %.

Step II

4'-propyl-3-fluorobiphenyl (52.5 g, 0.246 mole) and dry THF (250 cm$^3$) were stirred in the flask under $N_2$ atmosphere and then cooled to (−75° C.). Keeping temperature below (−70° C.) a solution of sec-butyl lithium (0.24 mole) in cyclohexane was dropped and then a solution of $I_2$ (62.5 g, 0.246 mole) in THF (200 cm$^3$) was dropping and temperature was kept below (−70° C.). The stirring was continued 1 hour and the temperature was allowed to reach RT slowly. Mixture was poured on water (2000 cm$^3$), decolored by $Na_2SO_3$ and filtered. The product was crystallized from hexane.

Yield of 4'-propyl-3-fluoro-4-iodobiphenyl, (74.8 g, 0.22 mole), 89.4 wt. %.

Step III

4'-propyl-3-fluoro-4-iodobiphenyl (34 g, 0.1 mole), triethylamine (15.2 g, 0.15 mole), complex $(Ph)_3P.PdCl_2$ (2 g), CuI (1 g) and THF (200 cm$^3$) were placed in a flask and heated to 50° C. in $N_2$ atmosphere then 4-propylphenylacetylene (14.4 g, 0.1 mole) was dropped. When exothermic reaction felt the mixture was poured on water and the product filtered off. The solid was washed with water and crystallized twice from acetone.

Yield of 1-(4'-propyl-3-fluorobiphenyl-4-yl)-2-(4-propylphenyl)ethyne (27 g, 0.075 mole) 75.8%, phase transition: Cr 87.1 N 201 Iso.

Step IV 1-(4'-propyl-3-fluorobiphenyl-4-yl)-2-(4-propylphenyl)ethyne (15.5 g, 0.043 mole), acetone (200 cm$^3$), Pd/C (2 g) were stirred and hydrogen was simultaneously bubbled. Exothermic reaction was running and after $H_2$ absorption was stooped catalyst was filtrated off. Then solution was filtrated through silica gel layer and solvent was evaporated. Product was crystallized from acetone-methanol solution.

Yield of 1-(4'-propyl-3-fluorobiphenyl-4-yl)-2-(4-propylphenyl)ethane (12 g, 0.033 mole) 77.5%. Phase transition Cr 58.8 N 82 Iso In the same way the following compounds were obtained:
1-(4'-ethyl-3-fluorobiphenyl-4-yl)-2-(4-propylphenyl)ethane
1-(4'-propyl-3-fluorobiphenyl-4-yl)-2-(4-ethylphenyl)ethane

Example 5

1-(4'-propyl-2,3-difluorobiphenyl-4-yl)-2-(4-propylphenyl)ethane 4-iodo-2,3-difluorobenzene was taken in the step I of example 4 instead of 3-bromo-fluorobenzene.

Yield of 1-(4'-propyl-2,3-difluorobiphenyl-4-yl)-2-(4-propylphenyl)ethyne, 79.5 wt. % phase transition Cr 93.9 N 191 Iso, and after hydrogenation 1-(4'-propyl-2,3-difluorobiphenyl-4-yl)-2-(4-propylphenyl)ethane was obtained.

Yield of 1-(4'-propyl-2,3-difluorobiphenyl-4-yl)-2-(4-propylphenyl)ethane 80.5 wt. %. Phase transition: Cr 49 N 58.8 Iso In the same way the following compounds were obtained:
1-(4'-ethyl-2,3-difluorobiphenyl-4-yl)-2-(4-propylphenyl)ethane
1-(4'-propyl-2,3-difluorobiphenyl-4-yl)-2-(4-ethylphenyl)ethane

Example 6

4-metoxy-3-fluoro-4'-propylbiphenyl 4-metoxy-3-fluoro-bromobenzene (32.8 g, 0.16 mole), 4-propylphenyl boronic acid (31.5 g, 0.192 mole), $K_2CO_3$ (66.2 g, 0.48 mole), acetone (150 cm$^3$), $H_2O$ (70 cm$^3$) was placed in the flask, stirring under $N_2$ flow and heat to boil. Then mixture was cooled to 50° C., catalyst $(CH_3COO)_2Pd$ (2% mol) was added and stirred was continued as temperature was decreased to RT. Acetone was distilled off and the crude product was extracted with dichloromethane, dried over $MgSO_4$, filtrated, the solvent was evaporated and the product was crystallized from hexane.

Yield of 4-propyl-4-metoxy-3-fluorobiphenyl (35 g, 90%), m.p. 69.1.

In the same way the following compounds were obtained:
4-propyl-4-ethoxy-3-fluorobiphenyl
4-pentyl-4-metoxy-3-fluorobiphenyl
4-pentyl-4-ethoxy-3-fluorobiphenyl
4-propyl-4-ethoxy-2-fluorobiphenyl
4-pentyl-4-metoxy-2-fluorobiphenyl
4-pentyl-4-ethoxy-2-fluorobiphenyl

Example 7

4-butoxy-3,3''-difluoro-4''-propylterphenyl

4'-propyl-3-fluoro-4-iodobiphenyl (18 g, 0.053 mole) described in step II of example 4, 4-butoxy-3-fluorophenyl boronic acid (10.5 g, 0.059 mole), $K_2CO_3$ (20 g, 0.150 mole), acetone (250 cm$^3$), $H_2O$ (100 cm$^3$) was treated as described example 6.

Yield of 4-butoxy-3,3'-difluoro-4''-propylterphenyl, (14.4 g, 0.038 mole, 72%)

Comparative Example

Mixture E7 composed from cyanobiphenyl and terphenyl compounds was chosen as dielectrically positive of high medium known from the art for example, *Proc. of SPIE* 5947, 594702-12 (2005) and BDH Prospect.

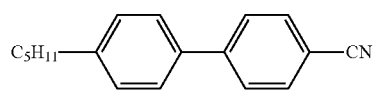

51

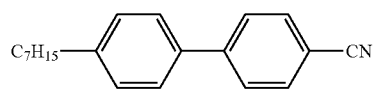

16

-continued

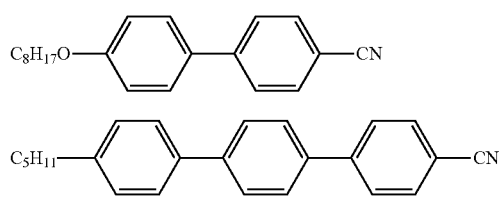

Cr—N (−10° C.), N-Iso 60° C.; Δn=0.225; η=40, Δ∈=12.6, ∈$_\parallel$=18.3, ∈$_\perp$=5.7, while three components eutectic isothiocyanato mixture A from the invention and with compositions given below have similar range of nematic phase and similar birefringence, but have a viscosity that is two times lower:

| | | | |
|---|---|---|---|
| 1.6 | 59.99% | | |
| 8.4 | 17.62% | | |
| 9.4 | 29.39% | | |

Cr—N (−15° C.), N-Iso 64.6° C., Δn=0.221, η=23.3, Δ∈=8.4, ∈$_\parallel$=12.4, ∈$_\perp$=4.0

The composition and physical properties at 20° C. are given below.

Increasing the polar isothiocyanato components in above mixture A to seven enhances the nematic range of phase and birefringence and keeps the viscosity small.

| | | | |
|---|---|---|---|
| 1.6 | 36% | $T_{N-I}$ | 79.5 |
| 4.4 | 9.0% | Tm | −20 |
| 5.1 | 4.6% | Δn | 0.251 |
| 7.4 | 9.4% | $n_e$ | 1.7852 |
| 8.4 | 12% | $n_o$ | 1.5341 |
| 9.4 | 20% | η | 22.70 |
| 10.5 | 9.0% | Δ∈ | 9.8 |
| | | ∈$_\parallel$ | 13.8 |
| | | ∈$_\perp$ | 4.0 |

Introducing to the above seven component mixture A two fluorobiphenyl and terphenyl derivatives decreases Δ∈ and involves the further increase of nematic phase and the birefringence and keeps viscosity small.

| | | | |
|---|---|---|---|
| 1.6 | 30% | $T_{N-I}$ | 84.5 |
| 8.4 | 10% | Tm | −25 |
| 9.4 | 16.7% | Δn | 0.2504 |
| 4.4 | 7.5% | $n_e$ | 1.7825 |
| 7.4 | 7.8% | $n_o$ | 1.5321 |
| 5.1 | 3.8% | ∈$_\parallel$ | 12.3 |
| 10.5 | 7.5% | ∈$_\perp$ | 4.9 |
| 17.3.2 | 8.35% | Δ∈ | 7.4 |
| 20.3.3 | 8.35% | η | 28.3 |

Example 8

| | | | |
|---|---|---|---|
| 1.3 | 10% | $T_{N-I}$ | 94.1 |
| 1.6 | 15% | Tm | <−30 |
| 2.3 | 10.0% | Δn | 0.259 |
| 3.4 | 6.0% | $y_1/k_{11}$ | 9.05 |
| 5.1 | 5.0% | FoM | 6.89 |
| 5.5 | 12% | ∈$_\parallel$ | 17.0 |
| 7.4 | 7.0% | ∈$_\perp$ | 6.6 |
| 13.3 | 7.0% | Δ∈ | 10.4 |
| 13.5 | 10.0% | $k_{11}$ | 21.5 |
| 16.3.2 | 15.0% | $y_1$ | 194 |
| 18.3.5 | 3.0% | | |

Example 9

Mixture A was formulated from isothiocyanato compounds having the composition and properties listed below:

| Mixture A | | | |
|---|---|---|---|
| 1.3 | 20.66% | $T_{N-I}$ | 109.4 |
| 3.4 | 8.26% | $T_{S-N}$ | −20 |
| 4.5 | 6.89% | Tm | <−30 |
| 5.1 | 4.82% | $V_{20}$ | 20.8 |
| 5.5 | 6.89% | Δn | 0.305 |
| 6.4 | 6.89% | $n_e$ | 1.839 |
| 8.3 | 4.13% | $n_o$ | 1.534 |
| 8.4 | 6.89% | ∈$_\parallel$ | 17.5 |
| 9.3 | 4.13% | ∈$_\perp$ | 3.9 |
| 9.4 | 6.89% | Δ∈ | 13.6 |
| 11.3 | 11.02% | v | 20.8 |
| 13.3 | 4.82% | γ/$k_{11}$ | 13.1 |
| 13.5 | 7.71% | | |

From mixture A (75 wt. %) and fluorocompounds B (25 wt. %) mixture AB was formulated having the composition and properties listed below:

| | | | |
|---|---|---|---|
| 1.3 | 15.49% | $T_{N-I}$ | 98 |
| 3.4 | 6.19% | Tm | <−30 |
| 4.5 | 5.17% | Δn | 0.3076 |
| 5.1 | 3.60% | $n_e$ | 1.8363 |
| 5.5 | 5.17% | $n_o$ | 1.5287 |
| 7.4 | 5.17% | ∈$_\parallel$ | 14.85 |
| 8.3 | 3.10% | ∈$_\perp$ | 4.95 |
| 8.4 | 5.17% | Δ∈ | 9.9 |
| 9.3 | 3.10% | v | 31.5 |
| 9.4 | 5.17% | | |
| 11.3 | 8.27% | | |
| 13.3 | 3.60% | | |
| 13.5 | 5.78% | | |
| 16.3.2 | 9.12% | | |
| 17.3.2 | 4.56% | | |
| 18.3.5 | 4.56% | | |
| 19.2.2 | 4.02% | | |
| 20.3.3 | 2.76% | | |

Example 10

| | | | |
|---|---|---|---|
| 1.3 | 13.43 | $T_{N-I}$ | 93 |
| 3.4 | 5.37 | Tm | <−35 |
| 4.5 | 4.48 | | |
| 5.1 | 3.13 | | |
| 5.5 | 4.48 | | |
| 7.4 | 4.48 | | |
| 8.3 | 2.68 | | |
| 8.4 | 4.48 | | |
| 9.3 | 2.68 | | |
| 9.4 | 4.48 | | |

-continued

| | |
|---|---|
| 11.3 | 7.16 |
| 13.3 | 3.13 |
| 13.5 | 5.01 |
| 16.3.2 | 12.77 |
| 18.3.5 | 6.39 |
| 18.3.2 | 6.39 |
| 19.2.2 | 5.62 |
| 20.3.3 | 3.83 |

Example 11

| | | | |
|---|---|---|---|
| 1.3 | 9% | $T_{N-I}$ | 91 |
| 1.6 | 14% | Tm | <−25 |
| 2.3 | 8.0% | $\Delta n$ | 0.2740 |
| 3.4 | 5.0% | $n_e$ | 1.7943 |
| 4.5 | 11.0% | $n_o$ | 1.5203 |
| 5.1 | 4.0% | $\epsilon_\parallel$ | 14.1 |
| 7.4 | 6.0% | $\epsilon_\perp$ | 5.5 |
| 13.3 | 6.0% | $\Delta\epsilon$ | 8.6 |
| 13.5 | 9.0% | $y_1/k_{11}$ | 8.73 |
| 16.3.2 | 15.0% | | |
| 17.3.2 | 5.0% | | |
| 18.3.5 | 3.0% | | |
| 19.2.2 | 5.0% | | |

Example 12

| | | | |
|---|---|---|---|
| 1.3 | 10% | $T_{N-I}$ | 112.5 |
| 1.6 | 15% | Tm | <−40 |
| 2.3 | 8.0% | $\Delta n$ | 0.285 |
| 3.4 | 6.0% | $n_e$ | 1.812 |
| 4.5 | 12.0% | $n_o$ | 1.527 |
| 5.1 | 5.0% | $\epsilon_\parallel$ | 15.6 |
| 7.4 | 7.0% | $\epsilon_\perp$ | 4.4 |
| 11.3 | 10.0% | $\Delta\epsilon$ | 11.2 |
| 13.3 | 7.0% | v | 23.5 |
| 13.5 | 10.0% | $y_1/k_{11}$ | 14 |
| 16.3.2 | 7.0% | | |
| 18.3.5 | 3.0% | | |

Example 13

To the mixture from Example 12, 4'-pentyl-4'-metoxytolane 8 wt. % and 4-butyl-4'-ethoxytolane 12 wt. % were added. The solid phase separated from the mixture at room temperature.

Example 14

| | | | |
|---|---|---|---|
| 1.3 | 15% | $T_{N-I}$ | 100.1 |
| 3.4 | 6% | Tm | <−30 |
| 4.5 | 10.0% | $\Delta n$ | 0.293 |
| 5.1 | 5.0% | $n_e$ | 1.823 |
| 7.4 | 7.0% | $n_o$ | 1.530 |
| 9.3 | 6.0% | $\epsilon_\parallel$ | 14.5 |
| 9.4 | 10.0% | $\epsilon_\perp$ | 5.0 |
| 11.3 | 10.0% | $\Delta\epsilon$ | 9.5 |
| 13.3 | 5.0% | v | 29.5 |
| 13.5 | 8.0% | $y_1/k_{11}$ | 14.9 |
| 16.3.2 | 10.0% | | |

-continued

| | |
|---|---|
| 18.3.5 | 3.0% |
| 19.2.2 | 5.0% |

Example 15

| | | | |
|---|---|---|---|
| 1.3 | 15% | $T_{N-I}$ | 103 |
| 3.4 | 6% | Tm | <−30 |
| 4.5 | 10.0% | $\Delta n$ | 0.3060 |
| 5.1 | 5.0% | $n_e$ | 1.8353 |
| 7.4 | 7.0% | $n_o$ | 1.5293 |
| 8.3 | 6.0% | $\epsilon_\parallel$ | 16.8 |
| 8.4 | 10.0% | $\epsilon_\perp$ | 5.0 |
| 11.3 | 10.0% | $\Delta\epsilon$ | 11.8 |
| 13.3 | 5.0% | v | 28.8 |
| 13.5 | 8.0% | $y_1/k_{11}$ | 14.2 |
| 16.3.2 | 10.0% | | |
| 17.3.2 | 3.0% | | |
| 19.2.2 | 5.0% | | |

Example 16

To the mixture from example 15 fluorotolanes was added 4'-(4-propylphenyl)-2'-fluoro-4-propyltolane, 4'-(4-propylphenyl)-2',3'-difluoro-4-propyltolane 5 wt. % was added a smectic A phase appears at 10° C.

Example 17

| | | | |
|---|---|---|---|
| 1.3 | 22.5% | $T_{N-I}$ | 90 |
| 1.4 | 11.46% | Tm | −40 |
| 1.6 | 18.9% | $\Delta n$ | 0.24 |
| 1.8 | 8.10% | $\Delta\epsilon$ | 8.0 |
| 3.2 | 9.24% | v | 16.0 |
| 3.4 | 9.90% | | |
| 3.6 | 9.90% | | |
| 14.1.1 | 9.5% | | |
| 26 | 0.5% | | |

Example 18

| | | | |
|---|---|---|---|
| 1.3 | 18% | $T_{N-I}$ | 99.5 |
| 1.5 | 5% | Tm | <−5 |
| 3.4 | 8% | $\Delta n$ | 0.2718 |
| 4.5 | 10% | $n_e$ | 1.8013 |
| 4.7 | 10% | $n_o$ | 1.5295 |
| 7.3 | 7% | $\epsilon_\parallel$ | 12.72 |
| 7.5 | 9% | $\epsilon_\perp$ | 4.15 |
| 8.4 | 6% | $\Delta\epsilon$ | 8.57 |
| 11.5 | 7% | $\eta$ | 31.26 |
| 14.3.4 | 7% | | |
| 17.3.2 | 7% | | |
| 20.3.3 | 3% | | |
| 22.3.4 | 2.9% | | |
| 27 | 0.1% | | |

It will, of course, be appreciated that the above description has been given by way of example only and that modifications in detail may be made within the scope of the present invention.

Throughout this application, various patents, publications, and articles have been cited. The disclosures of these patents, publications, and articles in their entireties are hereby incorporated by reference into this application, in order to more fully describe the state of the art to which this invention pertains.

The invention is capable of considerable modification, alteration, and equivalents in form and function, as will occur to those ordinarily skilled in the pertinent arts having the benefit of this disclosure.

While the present invention has been described for what are presently considered the preferred embodiments, the invention is not so limited. To the contrary, the invention is intended to cover various modifications and equivalent arrangements included within the spirit and scope of the detailed description provided above.

What is claimed is:

1. A liquid crystalline nematic medium comprising:
   a. a mixture comprising at least six isothiocyanato components selected from the group consisting of formulae 1-13:

1
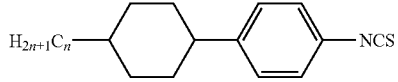

2
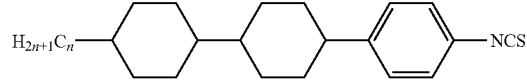

3
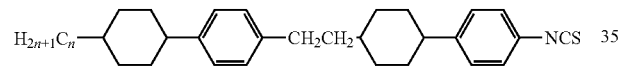

4
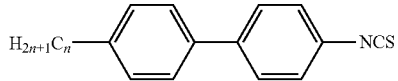

5
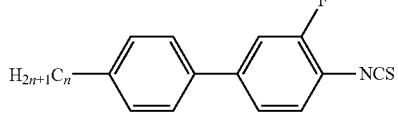

6
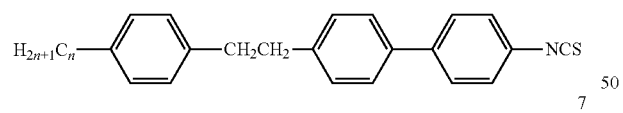

7
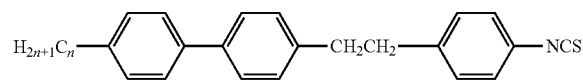

8

9
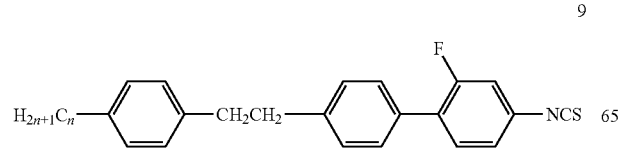

10
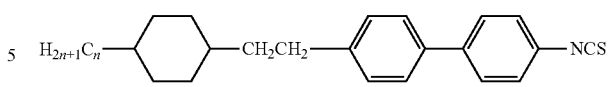

11
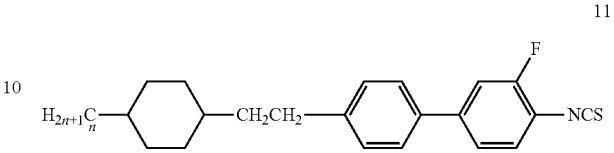

12
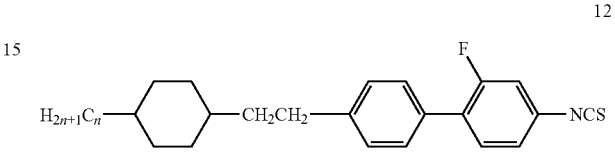

13
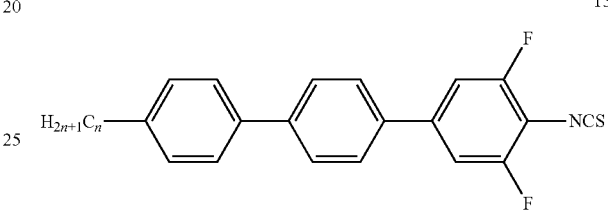

wherein n is an integer of from 1 to 5, and b. at least one compound selected from the group consisting of fluorosubstituted biphenyls and/or terphenyls expressed by the formulae 14-24

14
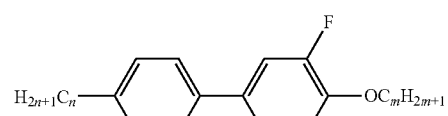

15
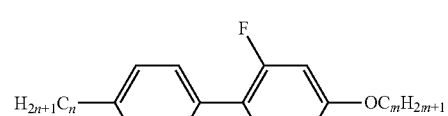

16
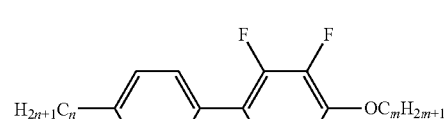

17
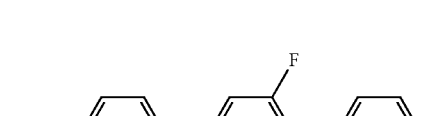

18
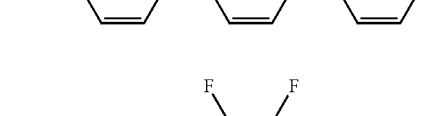
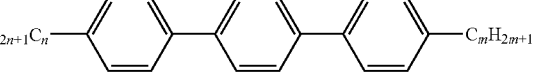

-continued

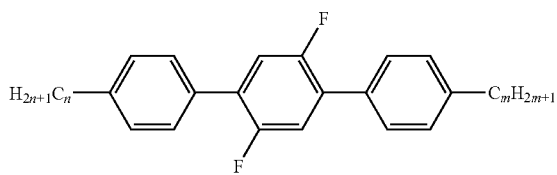
19

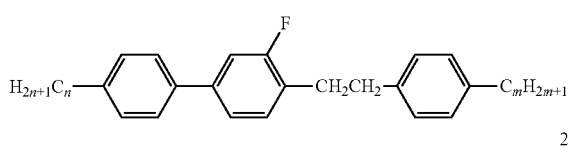
21

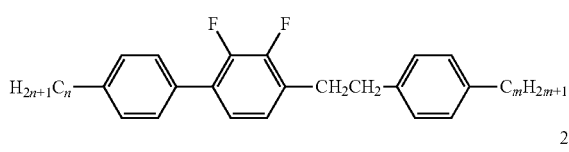
22

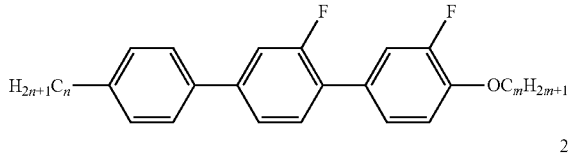
23

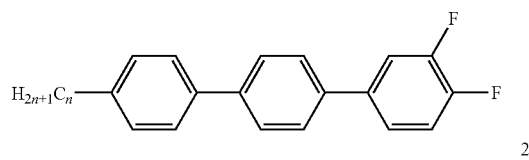
24

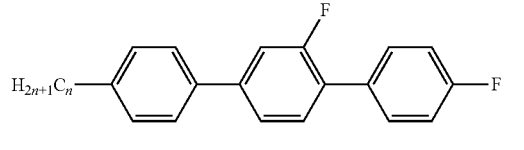

wherein n and m are independently integers of from 1 to 5.

2. The liquid crystalline medium according to claim 1, wherein one or more of the at least six isothiocyanato components are selected from the group consisting of formulae 9, 10, and 11.

3. The liquid crystalline medium according to claim 1, wherein the mixture comprising at least six isothiocyanato components is provided in an amount ranging from about 40 to about 95 wt. %.

4. The liquid crystalline medium according to claim 2, further comprising a chiral compound selected from the group consisting of formulae 25, 26, and 27

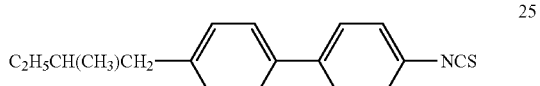
25

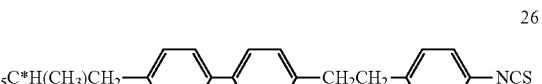
26

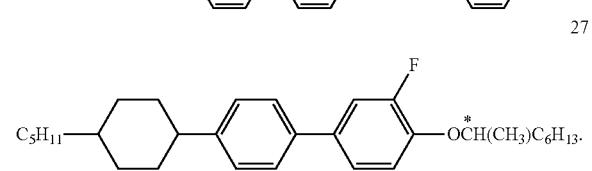
27

5. The liquid crystalline medium according to claim 1, wherein the medium has an optical anisotropy in the range from 0.2 to 0.35.

6. The liquid crystalline medium according to claim 1, wherein the medium further comprises UV stabilizers and polymers.

7. The liquid crystalline medium according to claim 2, wherein the medium further comprises UV stabilizers and polymers.

8. The liquid crystalline medium according to claim 4, wherein the medium further comprises UV stabilizers and polymers.

* * * * *